(12) United States Patent
Kim et al.

(10) Patent No.: US 6,724,816 B1
(45) Date of Patent: Apr. 20, 2004

(54) APPARATUS FOR RECEIVING MOTION PICTURE

(75) Inventors: Eung Tae Kim, Seoul (KR); Jin Gyeong Kim, Kyonggi-do (KR); Seung Jong Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 654 days.

(21) Appl. No.: 09/641,921

(22) Filed: Aug. 21, 2000

(30) Foreign Application Priority Data

Aug. 20, 1999 (KR) ........................................ 1999/34694

(51) Int. Cl.$^7$ ................................................. H04N 7/12
(52) U.S. Cl. ........................... 375/240.03; 375/240.25
(58) Field of Search ................. 375/240.16, 240.03, 375/240.26, 240.25; 382/305

(56) References Cited

U.S. PATENT DOCUMENTS

| | | | | |
|---|---|---|---|---|
| 5,870,087 A | * | 2/1999 | Chau | 715/500.1 |
| 5,986,711 A | * | 11/1999 | Pau | 375/240.18 |
| 6,023,295 A | * | 2/2000 | Pau | 375/240.04 |
| 6,078,620 A | * | 6/2000 | Rennig | 375/244 |
| 6,208,333 B1 | * | 3/2001 | Tateyama | 345/555 |
| 6,320,907 B1 | * | 11/2001 | Pau et al. | 375/240.22 |

\* cited by examiner

*Primary Examiner*—Chris Kelley
*Assistant Examiner*—David Czekaj
(74) *Attorney, Agent, or Firm*—Birch, Stewart, Kolasch & Birch, LLP

(57) ABSTRACT

An apparatus for receiving motion pictures is disclosed. The present invention reduces an external memory in an MPEG-2 decoding chip, which is a standard device in the field of digital video transmission. Particularly, a data processing structure is disclosed for compressing video-decoded data in an ADPCM method and storing the same in an external memory so as to ease compensation for motion in a macro-block unit of the MPEG-2 standard device as well as to maintain motion pictures of high definition.

18 Claims, 11 Drawing Sheets

<Y>

<Cb>  <Cr>

APPARATUS FOR RECEIVING MOTION PICTURE

BACKGROUND OF THE INVENTION

1. Field of the Invention

The present invention relates to a digital TV or a digital image conference system, and more particularly to an apparatus for receiving motion pictures to reduce an external memory of a MPEG-2 decoding chip, which is a standard device in digital video transmission.

2. Discussion of the Related Art

Recently, digital TV broadcasting has been gaining more attention. Accordingly, efforts are being made to better compress and transmit video data to allow a clear and high definition screen on household TVs. Having a high compression rate of $\frac{1}{40}$~$\frac{1}{60}$, A MPEG-2 is primarily used as an algorithm to compress the video signals. The MPEG-2 algorithm has allowed and prompted further research to transmit digital data of high definition to households through general broadcasting channels. Accordingly, a digital TV receiver requires a MPEG-2 video decoder for reconstruction of the compressed data to the original video data of high definition.

FIG. 1 is a block diagram of a MPEG decoding system in the related art. Referring to FIG. 1, a transport (TP) decoder 101 selects a program signal from a plurality of programs included in one channel, and separates the selected signal packet into audio bit stream and video bit stream to output the separated video bit stream to a video decoder 102 through a data bus. The video decoder 102 eliminates overheads such as various header information and start codes, from the video stream and performs a variable length decoding (VLD). The video decoder 102 also performs an inverse quantization, an inverse discrete cosine transformation (IDCT), and motion compensation using motion vectors to restore pixel values of the original screen and to output the pixel values to a video display processor (VDP) 103. The VDP 103 either re-sorts or outputs the data of restored pixel values in accordance with the picture coding types.

The video decoder system based on MPEG-2 uses an external memory 105, which comprises a buffer and two or more frame memories for temporarily storing a bit stream. Here, a dynamic RAM (DRAM) is usually used as the frame memory. In a video decoder, the role of the external memory 105 is mainly divided into the following categories: writing and reading data for video decoding; reading data required for motion compensation; and writing and reading of decoded data to be displayed. The data are exchanged under the control of a memory control unit 104.

However, to decode a video data of MPEG-2 MP@HL, the amount of data increases by approximately six times more than that of MPEG-2 MP@ML. Thus, more than 93 Mbit of data needs to be processed per second, requiring a large memory and a high speed data transmission. Also, a bit-buffer size of about 10 Mbit with maximum bit rate of about 80 Mbit is required to support the MP@HL mode within the standard MPEG-2. Accordingly, a MPEG-2 video decoder based on the conventional 16 Mbit of DRAM requires an external memory of about 96–128 Mbit. This means an escalation in the cost of the memory.

For competitiveness of the product cost as well as for an appeal to consumers, it is critical to retain a motion picture of high definition while reducing the price of the memory. Moreover, in view of the current trend of providing diverse kinds of on-screen display (OSD) and services, additional memories would probably be required in the future. For example, recent MPEG-2 video decompression system provides diverse services by decoding and simultaneously displaying multiple types of video signals. In such case, the system should be able to decode multiple video signals using a limited memory.

In consideration of the limits and costs of a memory as well as the bandwidth of a data bus, an efficient memory reduction apparatus is required to minimize the loss of high definition video signals in a video decoding chip. As a result, several methods have been suggested for that purpose.

One memory reduction algorithm in the related art is mounted inside a video decoding chip and suggests an adaptive differential pulse coded modulation (ADPCM) having a reduction rate of 50%. Another memory reduction algorithm in the related art which is mounted inside a video decoding chip eliminates spatial redundancy using a vector quantization (VQ) having a reduction rate of 75%. Moreover, a compressing manner utilizing a filtering/down-sampling in a DCT frequency region has been suggested.

However, in the above methods, either the complicated texture is degraded in the reduction rates of 50~75% or it is difficult to provide a high definition MPEG-2 MP@HL with a high color components. In other words, a relation between the motion picture of high definition and the reduction rate is not only inverse proportion but also requires a very complicated algorithm. Accordingly, it is difficult to implement such a complicated algorithm by means of an integrated circuit(IC). Furthermore, implemented a complicated algorithm poses a problem of increasing the number of gates.

OBJECTIVES OF THE INVENTION

An object of the present invention is to solve at least the problems and disadvantages of the related art.

An object of the present invention is to provide an efficient apparatus for receiving and processing motion pictures with high definition.

Another object of the present invention is to efficiently reduce an external memory of a MPEG-2 video decoder.

A further object of the present invention is to provide an efficient apparatus for receiving motion pictures to compress and store video-decoded data in an external memory.

A still further object of the present invention is to provide an apparatus for receiving motion pictures to restore data which has been compressed and stored in an external memory.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, the apparatus for receiving motion pictures according to the present invention comprises a video decoder for performing a VLD of input video stream in macro-block units, restoring pixel values to the original screen after performing an inverse quantization, and motion compensating using motion vectors; an external memory for decoding the video signals; a compression unit for dividing a macro-block of the video-decoded pixel values into a plurality of sub-blocks, and compressing the pixel values video-decoded in sub-block units for storage in the external memory; a decompression unit for reading the pixel values compressed by and stored in the external memory; and a memory control unit for controlling compression/decompression of the data and storage of the data in the external memory.

The compression unit comprises a deviation calculation unit for calculating the standard deviation of the video-decoded data in a sub-block unit, a buffer for temporarily storing the video-decoded data in a macro-block unit; an ADPCM compression unit for outputting the first row in each sub-block into the original uncompressed pixel value, and coding the difference between a predicted pixel value and the current pixel value with respect to the remaining rows to adjust the quantization interval by applying the standard deviation; and a first-in first-out memory (FIFO) for adjusting the data rate between the video decoder and the external memory by temporarily storing an output of the ADPCM compression unit.

The adaptive quantization unit of the ADPCM compression unit is characterized by differentiating the quantization levels with respect to each luminance signal and color signal.

The deviation calculation unit of the ADPCM compression unit comprises a variance computing unit for obtaining variance in a sub-block unit after receiving a plurality of pixels in parallel within one clock; a deviation computing unit for obtaining standard deviation by taking a square root over the variance computing unit; a deviation control unit for outputting the least bit into zero if the standard deviation output from the deviation computing unit is a standard deviation of the luminance signal, and outputting the least bit if the standard deviation output from the deviation computing unit is a standard deviation of the color signals; a deviation adjustment unit for limiting the scope of standard deviation of the luminance signal and color signals output from the deviation control unit; a comparator for obtaining a maximum value of the prediction error from each difference signal of the plurality of pixels input to one clock in parallel, and comparing the obtained value with the predetermined threshold value; and an ultimate deviation output unit for outputting an ultimate deviation by adding a luminance signal offset or a color signal offset to the standard deviation of the deviation adjustment unit if the maximum value of the prediction error is determined to be greater than the predetermined threshold value by the comparator, and outputting an ultimate deviation to be the deviation of the deviation adjustment unit if the maximum value of the prediction error is determined to be less than the predetermined threshold value by the comparator.

The FIFO comprises a code FIFO for storing the code value quantized by the adaptive quantization unit; and a barrel shifter for bit-sorting the standard deviation and quantization code when writing/reading in the external memory. Also, the external memory is characterized in that the synchronous DRAM (SDRAM) is allocated to have different bank addresses in upper and lower slices thereof. Moreover, the memory control unit is characterized by generating a signal so that the data stretched over two slices are read by a memory interleaving access method when the compression unit reads data from the memory.

The present invention has a data processing structure for compressing video-decoded data in an ADPCM manner to be stored in the external memory to facilitate motion compensation in a macro-block unit and to retain motion picture of high definition. When compressing the data, each macro-block is selected after being divided into sub-blocks of 4×8 size. The first row of each block is stored as the original pixel value without being compressed, and ADPCM is performed for each of the remaining rows. At this stage, compression is performed by applying the adaptive standard deviation to quantization, and the resultant value is stored.

BRIEF DESCRIPTION OF THE DRAWING

The invention will be described in detail with reference to the following drawings in which like reference numerals refer to like elements wherein:

FIG. 11b shows an embodiment of a reading motion using an external memory of the read FIFO in FIG. 11a; and FIG. 12 is a block diagram of the ADPCM decoder in FIG. 11a.

DETAILED DESCRIPTION OF THE INVENTION

Figure 1:
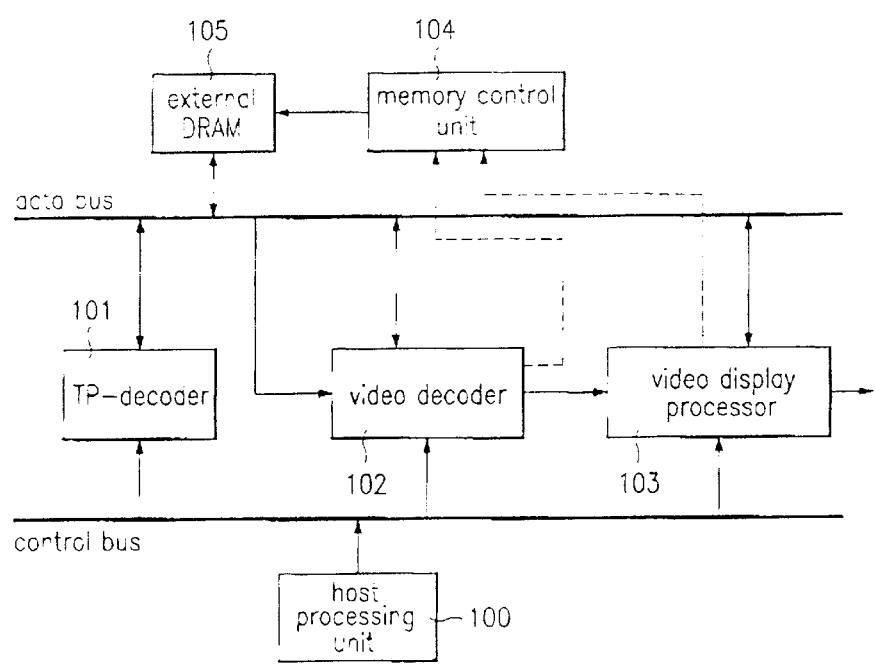
FIG. 1 is a block diagram of a MPEG decoding system in the related art.
Figure 2:
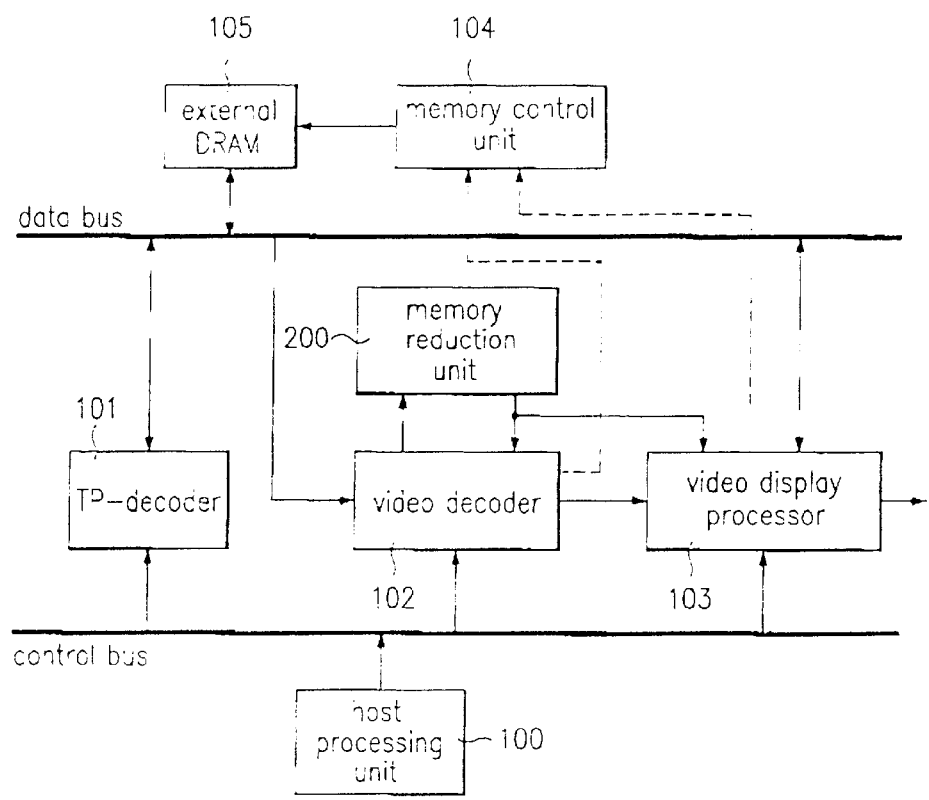
FIG. 2 is a block diagram of a MPEG decoding system according to the present invention.

FIG. 2 is a block diagram of a MPEG decoding system according to the present invention. Referring to FIG. 2, the MPEG decoding system includes a host processing unit 100, a TP decoder 101, a video decoder 102, a VDP 103, a memory control unit 104, and an external memory 105 as in a decoding system of the related art described with reference to FIG. 1. However, the present MPEG decoding system further includes a memory reduction unit 200 which reduces the memory required to process data. Also the external memory 105 may be a DRAM or a SDRAM which is interfacable with high speed.

Figure 3:
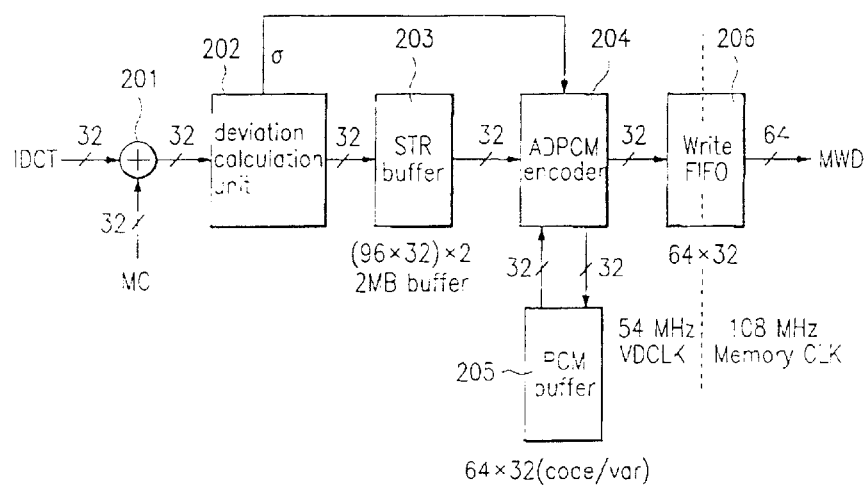
FIG. 3 is a block diagram of the memory reduction unit in FIG. 2.

FIG. 3 is a block diagram of the memory reduction unit 200 comprising an adder 201 which receives and adds IDCT data with motion compensated data from the video decoder 102; a deviation computing unit 202 which compensates from the output of the adder 201 a standard deviation σ; a STR buffer 203 which stores an output of the adder 201 in block units; an ADPCM encoder 204 which compresses the data within a macro-block stored in the STR buffer by ADPCM method based upon the standard deviation σ; a PCM buffer 205 which stores the data compressed by the ADPCM encoder 204; and a write FIFO 206 which reads and stores the data compressed and stored in the PCM buffer 205.

Particularly, the transport decoder 101 separates the audio bit stream from the video bit stream assembled as a packet, and outputs the separated video stream to the MPEG-2 video decoder 102. The MPEG-2 video decoder 102 motion compensates the video stream using VLD, IQ/IDCT, and motion vectors to construct I, P, B pictures. A complete image is restored when the data which has undergone the IDCT and the data which has been motion compensated are added by the adder 201 of the memory reduction unit 200.

Figure 6:
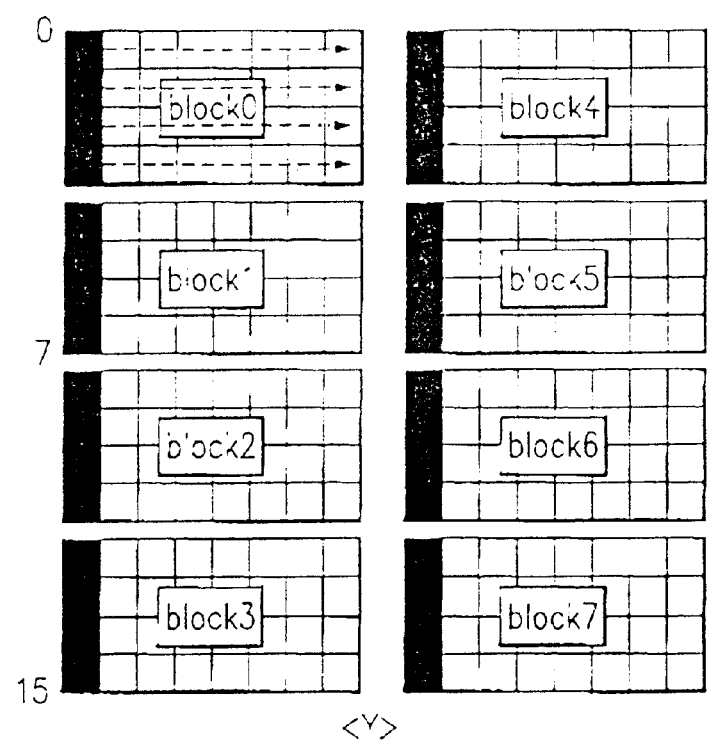
FIG. 6 shows a constitution of a sub-block inside a macro-block according to the present invention.
Figure 6:
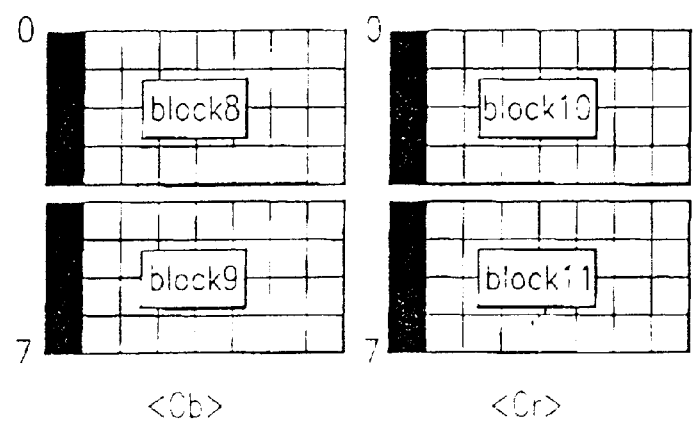

A macro-block of a restored image is then input to the deviation computing unit 202 and stored in the memory, i.e. the STR buffer 203. Here, the data bus of the macro-block is transmitted in a 32 bit (4 pixel×8 pixel) unit. The deviation computing unit 202 obtains and outputs the adaptive standard deviation σ from a macro-block unit to the ADPCM encoder 204. Namely, the standard deviation σ adjusts the quantization interval in each block. Also, the STR buffer 203 divides each macro-block into sub-blocks of 4×8 after temporarily storing a pixel value of the macro-block, and outputs the data to the ADPCM encoder 204 four pixels at a time. FIG. 6 shows a sub-block of a macro-block.

Referring to FIG. 6, each macro-block is divided into 32 bit units with respect to a luminance signal Y and color signals Cb, Cr. The division would result in eight sub-blocks for the luminance signal Y, and two sub-blocks for each of the color signals Cb, Cr. Here, the STR buffer 203 is a dual buffer for storing a macro-block and one of the dual buffers stores, for example, a 96×32 bit.

The ADPCM encoder 204 performs an ADPCM compression using the information output from the STR buffer 203 and using the standard deviation σ, and stores the result, i.e. a quantization code(m,n) and the standard deviation σ, in the PCM buffer 205.

Figure 4:
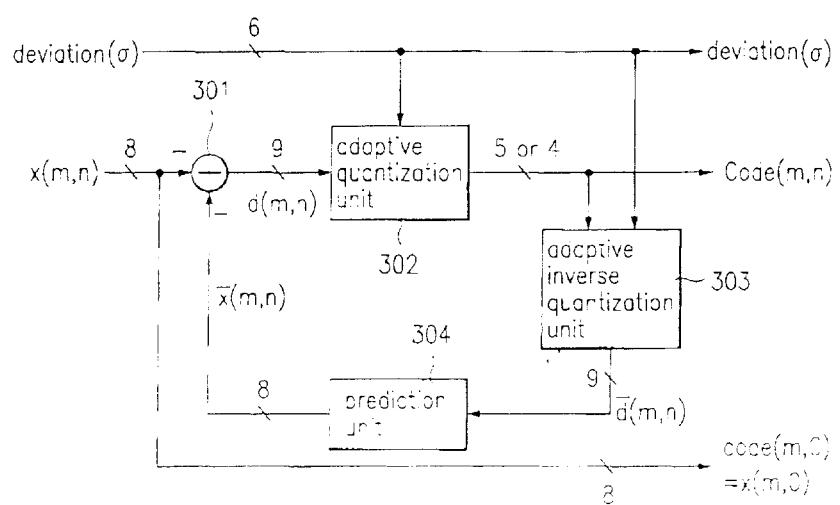
FIG. 4 is a block diagram of a compression unit of an ADPCM in FIG. 3.

FIG. 4 is a block diagram of the ADPCM encoder 204 comprising a subtractor 301 which outputs a difference $d(m,n)$ between the data $x(m,n)$ and a prediction data $\bar{x}(m,n)$; an adaptive quantization unit 302 which performs an adaptive quantization using the difference $d(m,n)$ and the standard deviation σ; an adaptive inverse quantization unit 303 which inverse quantizes the quantized data; and a prediction unit 304 which outputs the prediction data $\bar{x}(m,n)$ to the subtractor 301 after performing a prediction based on the inverse quantized data $\bar{d}(m,n)$.

Figure 5:
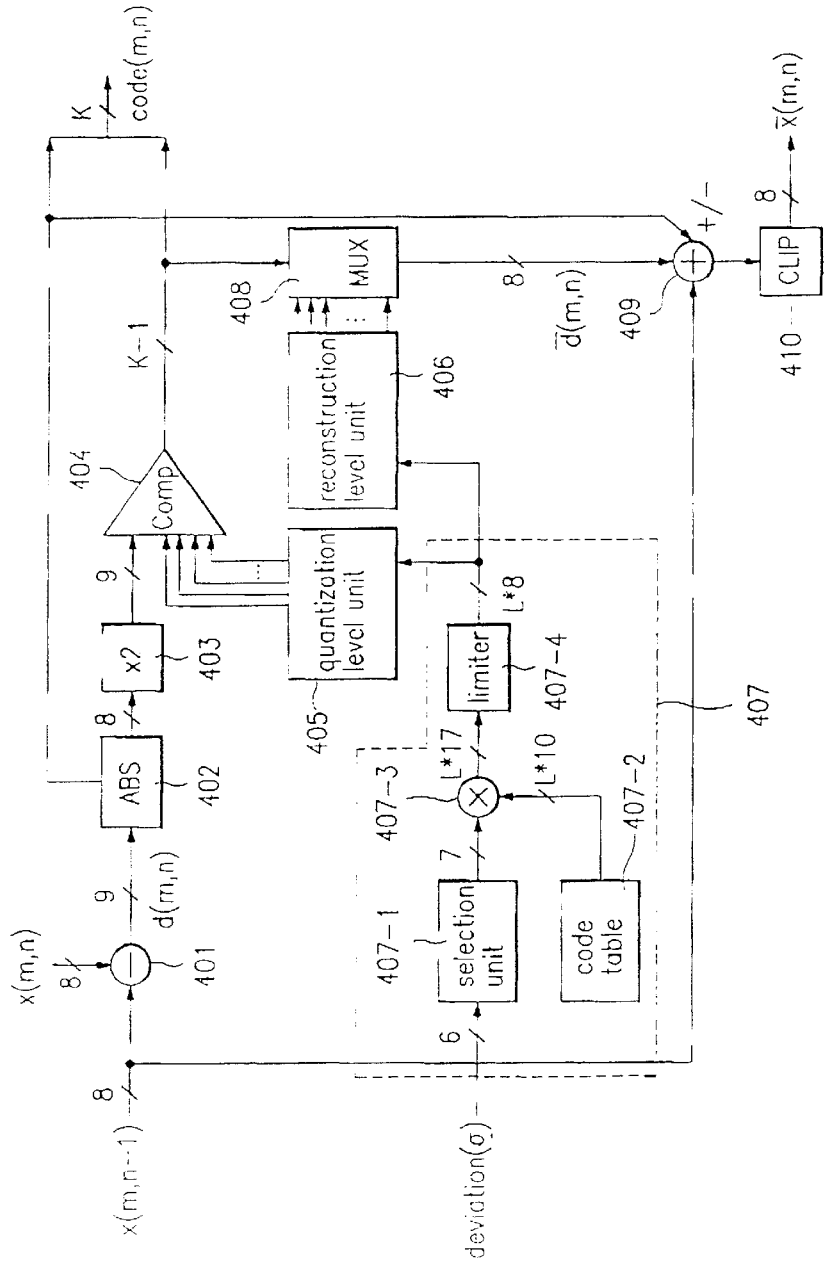
FIG. 5 is another block diagram of the ADPCM in FIG. 4.

FIG. 5 is a more detailed block diagram of the ADPCM in FIG. 4. Namely, the adaptive quantization unit 302 comprises an absolute value calculation unit (ABS) 402, a multiplier 403, a comparator 404, a quantization level unit 405, and a code table unit 407. The adaptive inverse quantization unit 303 comprises a reconstruction level unit 406 and a multiplexer 408. The prediction unit 304 comprises an adder 409 and a clipper 410.

The ADPCM encoder 204 as described above eliminates a redundancy using a correlation between a current pixel and a previous pixel. Particularly, the first row of each sub-block code(m,0) is transmitted as the original pixel value without being compressed and the remaining rows code(m,n) are transmitted by coding the difference between the prediction value and the current pixel value. In other words, the compression is enhanced by reducing the difference between the prediction value and the current pixel value to fall below the bit-precision of the current pixel. Here, the ADPCM encoder 204, as shown in FIG. 6, uses previous value of pixels in the horizontal direction of each row of a sub-block as the prediction value.

For example, assume that an image is divided into a M×N block. Define $x(m,n)$ to be a pixel value at the mth row in the nth column within the block. Define the value predicted by the prediction unit 304 to be $\bar{x}(m,n)$. The prediction value $\bar{x}(m,n)$ can then be expressed by the Equation 1:

$$\bar{x}(m,n) = x(m, n-1) \text{ if } m = 0, \ldots, M-1 \text{ and } n = 1, \ldots, N-1 \quad [1]$$
$$= 0 \quad \text{if } m = 0, \ldots, M-1 \text{ and } n = 0$$

Here, the subtractor 301 outputs a difference between the current pixel value $x(m,n)$ and a predicted pixel value $\bar{x}(m,n)$ of one previous cycle, and the present invention defines a prediction error to be $d(m,n)=x(m,n)-\bar{x}(m,n)$.

More specifically, the first pixels of a row are transferred in 8 bit/pixels while the remaining pixels are compressed to a fixed length code (FLC) after quantizing the difference value $d(m,n)$. Although the remaining pixels may be compressed into variable length codes, the preferred embodiment uses the FLC to facilitate addressing the memory map.

Also, to minimize the prediction error within a block of the ADPCM encoder 204, a quantization coefficient and a reconstruction level of the quantization unit 302 need to be effectively adjusted to fully express the prediction error. The present invention reduces various prediction errors caused by the existing 1-dimensional DCPM by adjusting the quantization interval to the characteristic features such as the average and standard deviation of the input signals.

For that purpose, the subtractor 401 outputs the prediction error $d(m,n)$ by obtaining a difference between the current pixel value $x(m,n)$ and the predicted preceding pixel value $\bar{x}(m,n-1)$. The most significant bit (MSB) of the prediction error $d(m,n)$ is a sign bit and the remaining bits have a data format expressing the respective sizes. The total value should be processed either to be a negative number or a positive number depending on whether the sign bit is '1' or '0'. However, in consideration of reducing the calculation, the present invention outputs the MSB corresponding to the sign bit as is, e.g. positive numbers, and takes an absolute value of the data bit at the ABS 402.

Moreover, an average value of two adjacent quantization values in the code table must be obtained to achieve a quantization level in the quantization level unit 405. A value of ½ needs to be multiplied at the end of the quantization level unit 405 to connect a truncation error generated in that process as well as to enhance the computation. However, to eliminate this multiplication, an output of the ABS 402 is multiplied by a value of 2 through the multiplier 403 and output to the comparator 404.

The comparator 404 compares the input data from the multiplier 403 with the quantization level values of the quantization level unit 405, and selects and outputs a quantization level value closest to the input data. If an output of the comparator 404 is multiplexed with a sign bit, the multiplexed value becomes a quantized code value code(m, n).

The quantization level values of the quantization level unit 405 is set with respect to the luminance signal and the color signals. For example, the luminance signal uses sixteen quantization levels, while the color signals use relatively a smaller number of eight quantization levels for coding. This means that the definition of motion pictures would be improved by allocating greater number of quantization levels to the luminance signal, which greatly affects the definition of motion pictures, than the color signals. Here, the intervals among the quantization levels i.e. the quantization intervals, are variable depending on the standard deviation σ.

Furthermore, the code table unit 407 comprises an L number of code tables (ROM) 407-2 of 10 bits and stores a normalized quantization value. Assuming that Q(I), where I=1, . . . , L is a normalized quantization value, $L=2^{(k-1)}$ represents a quantization level and K represents a number of quantization codes. The quantization level $L=2^{(k-1)}$ because the MSB is a sign bit and is excluded. For example. K=5 and L=16 for luminance signal while K=4, L=8 for color signals.

Meanwhile, the standard deviation σ calculated by the deviation calculation unit 202 is input to a selection unit 407-1 of the code table unit 407. The selection unit 407-1 multiplies the standard deviation σ by 2 when a currently quantized data is a luminance signal and outputs the result to a multiplier 407-3. When a currently quantized data is color signals, the data are output as is to the multiplier 407-3. In other words, the standard deviation σ for adjusting the quantization coefficient of the prediction error is differently adjusted depending on whether the signal is a luminance signal which greatly affects the definition of motion pictures, or color signals which less affect the definition of motion pictures.

The multiplier 407-3 determines a quantization interval by multiplying the standard deviation σ output from the selection unit 407-1 and the quantization value output from the code table 407-2. The output of the multiplier 407-3 is output to the quantization level unit 405 and the reconstruction level unit 406 through a limiter 407-4. The limiter 407-4 prevents an output of the multiplier 407-3 from going over a quantization range.

For example, assuming that Q(I), for I=1, . . . , L is a normalized quantization value stored in the code table 407-2, the quantization coefficient within a block is adjusted by the multiplier 407-3 as described by Equation 2:

$$\hat{Q}=Q(1)\times\sigma \qquad (2)$$

Thus, the comparator 405 quantizes the prediction error using $\hat{Q}$. Here, assume that the distribution of the prediction error follows the Guassian or Laplacian distribution. The prediction error has different distributions for the luminance signal and the color signals. Generally, the variance of the color signal distribution in a block is much less than the variance of the luminance signal distribution in a block. Therefore, an improved image quality can be obtained by allocating more quantization levels for the luminance signal.

For example, the quantization level of a luminance signal is defined to have sixteen levels, and the intervals among the levels are variable depending on the size of the standard deviation. If the value of the standard deviation σ is great, the intervals among the quantization levels are wide. If the value of the standard deviation σ is small, the intervals among the quantization are narrow. This means that, the greater the value of the standard deviation σ, the greater the change of an image within a block. Therefore, even if the quantization interval become wider, the human eyes cannot seriously perceive the change.

Meanwhile, the reconstruction level unit 406 adjusts each level by the limiter 407-4. The multiplexer 408 then selects one of the L number of outputs from the reconstruction level unit 406 using the output of the comparator 404 as a selection signal The selected value becomes an adaptive inverse quantization value, i.e. a quantization difference signal.

The adaptive inverse quantization value is input to the adder 409 of the prediction unit 304. The adder 409 obtains the prediction value $\bar{x}(m,n)$ for an input signal by adding the inverse quantized pixel value $\bar{d}(m,n)$ and the sign bit from the ABS 402 to the predicted pixel value $\bar{x}(m,n-1)$ of one previous cycle. The sum output from the adder 409 is output to the subtractor 401 as a prediction value through a clipper 410. The clipper 410 outputs the prediction value, which is input in 9 bits, by 8 bits in conformity with the number of bits of a current pixel.

Figure 7:
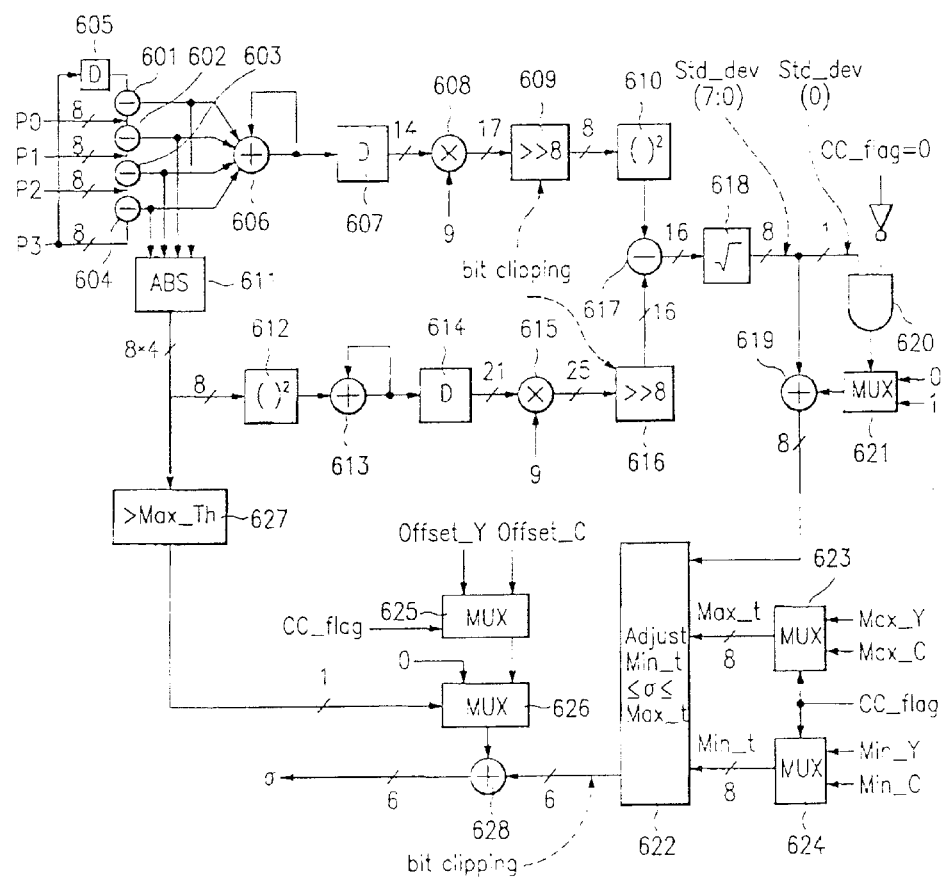
FIG. 7 is a block diagram of a deviation computing unit in FIG. 3.

FIG. 7 is a block diagram of the deviation calculation unit 202 including a device for adjusting an interlaced scanning and a progressive scanning standard deviation to conform with the DCT type of a macro-block. The input signals are effectively aligned in accordance with the DCT type. For interlaced scanning, the standard deviation is obtained in a field unit. In other words, one set of sub-blocks are created from pixels within even fields while another set of sub-blocks are created from pixels within odd fields.

For progress scanning, the standard deviation is obtained based upon frame units. Accordingly, the correlation among pixel values of adjacent lines is increased and properties within a block to be compressed can be more accurately obtained, thereby enhancing the compression rate.

Definition of a standard deviation σ is as follows. The standard deviation σ is a square root value of a variance $\sigma^2$. Here, the variance $\sigma^2$ refers to a distance from a mean, and the mean refers to a resultant value obtained by dividing the sum of source values into the number of sources. The above variance $\sigma^2$ and the standard deviation σ can be expressed by the following Equation 3.

$$\sigma^2 = \frac{1}{N}\sum x^2 - \left(\frac{1}{N}\sum x\right)^2 \qquad [3]$$

$$\sigma = \sqrt{\frac{1}{N}\sum x^2 - \left(\frac{1}{N}\sum x\right)^2}$$

The reference numerals 601 to 617 in FIG. 7 represent blocks to obtain the variance $\sigma^2$ according to Equation 3, while the reference numeral 618 represents a block to obtain the standard deviation σ by taking a square root over the variance $\sigma^2$.

According to the present invention, the first row of each sub-block is transmitted as original pixel values without being compressed, and for the remaining rows, the difference between the prediction value and a current pixel value is coded and transmitted. Therefore, M number of 8 bit/pixel values and M×(N−1) number of prediction error values are obtained from one block. Namely, in the present invention, one macro-block is divided into 4×8 sub-blocks. Thus, four 8 bit/pixel values and twenty eight prediction error values are obtained, and N in Equation 3 becomes 28.

Referring to FIG. 7, 32 bits are input four pixels P0–P3 at a time respectively to subtractors 601–604 in one clock. Here, the last pixel P3 is input to the subtractors 601–604 after being delayed by a one clock delayer 605. Each difference signal obtained by the subtractors 601–604 is input to an adder 606 and is added to the fed-back data for accumulation. As the standard deviation σ is sought for each block, the output of the adder 606 is fed back eight times for accumulation. For example, assuming that an output of the adder 606 is X in Equation 3, a signal which passed through the adder 606 and the delayer 607 becomes ΣX.

An average value is obtained by multiplying the signal delayed by a delayer 607 by 1/N. Since N is 28 in the present invention, the signal is multiplied by the constant 9 in a multiplier 608. The average value is then obtained from the output signal 608 by shifting a shifter 609 eight times toward the left direction. The constant 9 in the multiplier 608 can be obtained by adding 1 after shifting the shifter 609 three times toward the left direction. The output becomes 1/256 if the shifter 609 shifts eight times toward the right direction and 9/256 becomes approximately 1/28. The reason for the approximation is to simplify the complicated structure of hardware in the multipliers.

The first term $$\frac{1}{28}\sum_{i=1}^{28} X^2$$

to calculate $\sigma^2$ in Equation 3 is obtained by squaring the output of the shifter 609 in a square computing unit 610.

Meanwhile, each output of the subtractors 601–604 is also input to a square computing unit 612 and a comparator 627 after taking an absolute value from an absolute value computing unit 611. Here, the absolute value is taken to reduce the data bit. Accordingly, the square computing unit 612 respectively squares each of the absolute values of the four difference signals. The resultant value is then added to the data fed back by an adder 613 for accumulation. The above process is reputed eight times, and the output of the adder 613 is averaged by a delayer 614, multiplier 615 and a shifter 616. Thus, the output of the shifter 616 becomes the second term $$\left(\frac{1}{28}\sum_{i=1}^{28} X\right)^2$$

to calculate $\sigma^2$ in Equation 3.

The variance $\sigma^2$ can be obtained by subtracting the output of the shifter 616 from the output of the square computing unit 619 in a subtractor 617. The standard deviation $\sigma$ can be obtained by taking a square root over the variance $\sigma^2$ in a root unit 618. The standard deviation Std_dev (7:0) obtained by the root unit 618 is input to an adder 619, while the least significant bit Std_dev (0) is input to an AND gate 620.

The output of the AND gate 620 is output to a multiplexer 621 after performing an logically AND function on the least significant bit Std_dev (0) and a CC_flag value of the standard deviation $\sigma$. Here, the CC_flag is a flag representing whether a currently input data is a luminance signal or a color signal. If the currently input data is a luminance signal, the CC_flag is set, for example, to be 0. In such case, the CC_flag is set to 1 for a color signal.

Therefore, if the CC_flag is 1, i.e. the currently input data is a color signal, the AND gate 620 outputs 0 irrespective of the least significant bit Std_dev (0) of the standard deviation, and the multiplexer 621 selects and outputs a value of 0. On the other hand, if the CC_flag is 0, i.e. a luminance signal, the AND gate 620 outputs 1 when the least significant bit Std_dev (0) of the standard deviation is 1, and outputs 0 when the least significant bit Std_dev (0) of the standard deviation is 0. Thereafter, the multiplexer 621 selects 0 if the AND gate 620 outputs 0 and selects 1 if the AND gate 620 outputs 1 to output to the adder 619.

The above procedure reduces the number of bits to be processed. Particularly, for a luminance signal, eliminating the least significant bit after making the standard deviation to be an even number reduces the number of bits to be processed. For a color signal, additional procedure is not performed because the amount of its energy is too little. Thus, the standard deviation for adjusting the quantization coefficient of the prediction error is adjusted differently depending on the kind of signals. For example, the coded bits of standard deviation for luminance signal are not 6 bits, but is 5 bits. The least significant bit is omitted to save memory space.

The adder 618 adds the standard deviation from the root unit 618 with the output of the multiplexer 621 and outputs the sum to a standard deviation adjustment unit 622.

If the prediction value of the standard deviation is much greater or less than the actual prediction error, the quantization error also becomes great. Therefore, it is necessary to limit the range (Min_Y~Max_Y, Min_C~Max_C) of the luminance signal and color signals, respectively, to correct the error. This is to limit the quantization reconstruction level such that the range of the quantization intervals does not exceed a certain limit.

The multiplexer 623 outputs a maximum value MAX_t with respect to the luminance signal and color signals. If the CC_flag is 0, i.e. a luminance signal, the value of Maz_Y is selected and output to the standard deviation control unit 622 as MAX_t. If CC_flag is 1, i.e. a color signal, the value of Max_C is selected and output to the standard deviation control unit 622 as MAX_t. Similarly, the multiplexer 623 outputs a minimum value Min_t with respect to the luminance signal and color signals. If the CC_flag is 0, the value of Min_Y is selected and output to the standard deviation control unit 622 as Min_t. If the CC_flag is 1, the value of Min_C is selected and output to the standard deviation control unit 622 as Min_t.

The standard deviation control unit 622 controls the standard deviation $\sigma$ input from the adder 619 to be within the range of Max_t$\leq\sigma\leq$Min_t and outputs the controlled $\sigma$ to an adder 628. For a luminance signal, the standard deviation $\sigma(Y)$ is within the range of Min_Y$\leq\sigma(Y)$$\leq$Max_Y. For a color signal, the standard deviation $\sigma(C)$ is within the range of Min_C$\leq\sigma(C)\leq$Max_C.

When the actual prediction error is great (e.g. when a slope overload is generated or an edge exists within a block), the quantization error needs to be corrected. In such case, the present invention widens the quantization interval by increasing the standard deviation output from the deviation adjustment unit 622. Because the change is great, increasing the quantization interval would not greatly affect the human eyesight.

The absolute value computing unit 611 takes the absolute value of each difference signal from the subtractors 601–604 to obtain a maximum value of the prediction error. The comparator 627 compares whether the maximum value of the prediction error is greater than a predetermined threshold value Max_Th, and outputs the resultant value to a multiplexes 626 as a selection signal. Depending upon the selection signal, for a luminance signal, the multiplexer 626 selects and outputs 0 or a luminance signal offset Offset_Y input through a multiplexer 625. Depending also upon the selection signal, for a color signal, the multiplexer 626 selects and outputs 0 or a color signal offset Offset_C input through the multiplexes 625.

Moreover, depending on the current status of the CC_flag, the multiplexer 625 selects either one of the above two offsets, i.e. the luminance signal offset Offset_Y when CC_flag=0 and the color signal offset Offset_C when CC_flag=1, to be output to the multiplexer 626.

Accordingly, if the current status of the CC_flag indicates a luminance signal and the actual prediction error is great, i.e. the maximum value of the prediction error is greater than the threshold value Max_Th, the multiplexer 626 selects the luminance signal offset Offset_Y to be output to the adder 628. If the maximum value of the prediction error is not greater than the threshold value Max_Th, the multiplexer 626 selects 0 to be output to the adder 628.

If the current status of the CC_flag indicates a color signal and the actual prediction error is great, the multiplexer 626 selects and outputs the color signal offset Offset_C to the adder 628. Otherwise, the multiplexer 626 selects 0 to be output to the adder 628.

The adder 628 obtains a final standard deviation by adding the output of the multiplexer 626 to the standard deviation output from the deviation adjustment control unit 622. In other words, if the current status of the CC_flag indicates a luminance signal and the actual prediction error is great, the standard deviation output from the deviation adjustment control unit 622 is added to the luminance signal offset Offset_Y by the adder 628 to be output as the final standard deviation. If the prediction error is small, 0 is selected and output by the multiplexer 626. Thus, the output of the deviation adjustment control unit 622 is output as is as the ultimate standard deviation of the luminance signal.

Likewise, if the current status of the CC_flag indicates a color signal and the actual prediction error is great, the standard deviation output from the deviation adjustment control unit 622 is added to the color signal offset Offset_C by the adder 628 to be output as the final standard deviation. If the prediction error is small, 0 is selected and output by the multiplexer 626. Thus, the output of the deviation adjustment control unit 622 is output as is as the ultimate standard deviation of the color signal.

Thus, the quantization error is reduced by forcibly increasing the quantization intervals when the maximum value of the prediction error Maximum_Difference d(m,n) exceeds the predetermined threshold value Max_Th. The following Equation 4 expresses the above process.

For a luminance signal:

$$\text{Min\_Y} \leq \sigma(Y) \leq \text{MAX\_Y}$$

if Maximum_Difference(d(m,n))>Max_Th $$\sigma(Y)=\sigma(Y)+\text{Offset\_Y}$$

else $$\sigma(Y)=\sigma(Y)$$

For a color signal:

$$\text{Min\_C} \leq \sigma(C) \leq \text{Max\_C}$$

if Maximum_Difference(d(m,n))>Max_Th $$\sigma(C)=\sigma(C)+\text{Offset\_C}$$

else $$\sigma(C)=\sigma(C) \qquad (4)$$

The final standard deviation from the adder 628 is output to the adaptive quantization unit 302 and the adaptive inverse quantization unit 303 of the ADPCM encoder 204, and to the write FIFO 206.

The quantization code(m,n) which has undergone the ADPCM in the ADPCM encoder 204 using the final standard deviation, is stored in the PCM buffer 205 and is output to the write FIFO 206. The PCM buffer 205 has a size of 32×64 bits, for example. This means that the PCM buffer 205 can store information on 11.5 macro-blocks for a luminance signal Y, and 27 macro-blocks for a color signal C. The following is the length of the code stored in the PCM buffer 205.

For a luminance signal:
  M×(8+5×7)=M×43 bits (when N=8, L=16)
For a color signal:
  M×(8−4×7)=M×36 bits (when N=8, L=8)

When completely filled, the PCM buffer is finally stored in the external memory 105 through the data bus of 64 bits. At this stage, the write FIFO 206 is used to match the memory clock 105 with the video decoder 102. Particularly, data is exchanged with the video decoder 102 through the data bus of 32 bits, and exchanged with the external memory 105 through the data bus of 64 bits. The data rate is bit-aligned through the write FIFO 206 for adjustment.

Figure 8:
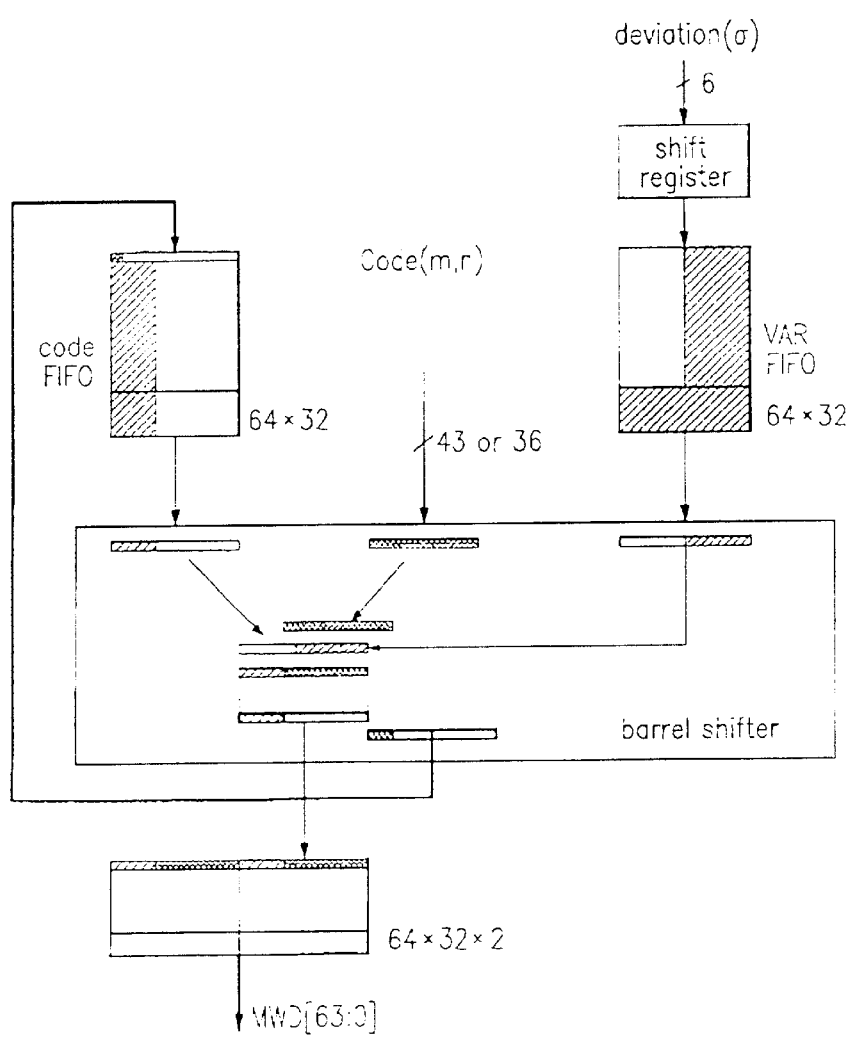
FIG. 8 is a block diagram of a write FIFO in FIG. 3.

The write FIFO 206 performs a bit-alignment using a barrel shifter, as shown in FIG. 8, when writing/reading the quantization code(m,n), which has undergone the standard deviation and ADPCM, in the external memory 105. The barrel shifter in FIG. 8 shows a structure to accumulate the code and standard deviation in a code FIFO and a Var FIFO for use in the external memory 105 having the data bus of 64 bits.

Figure 9:
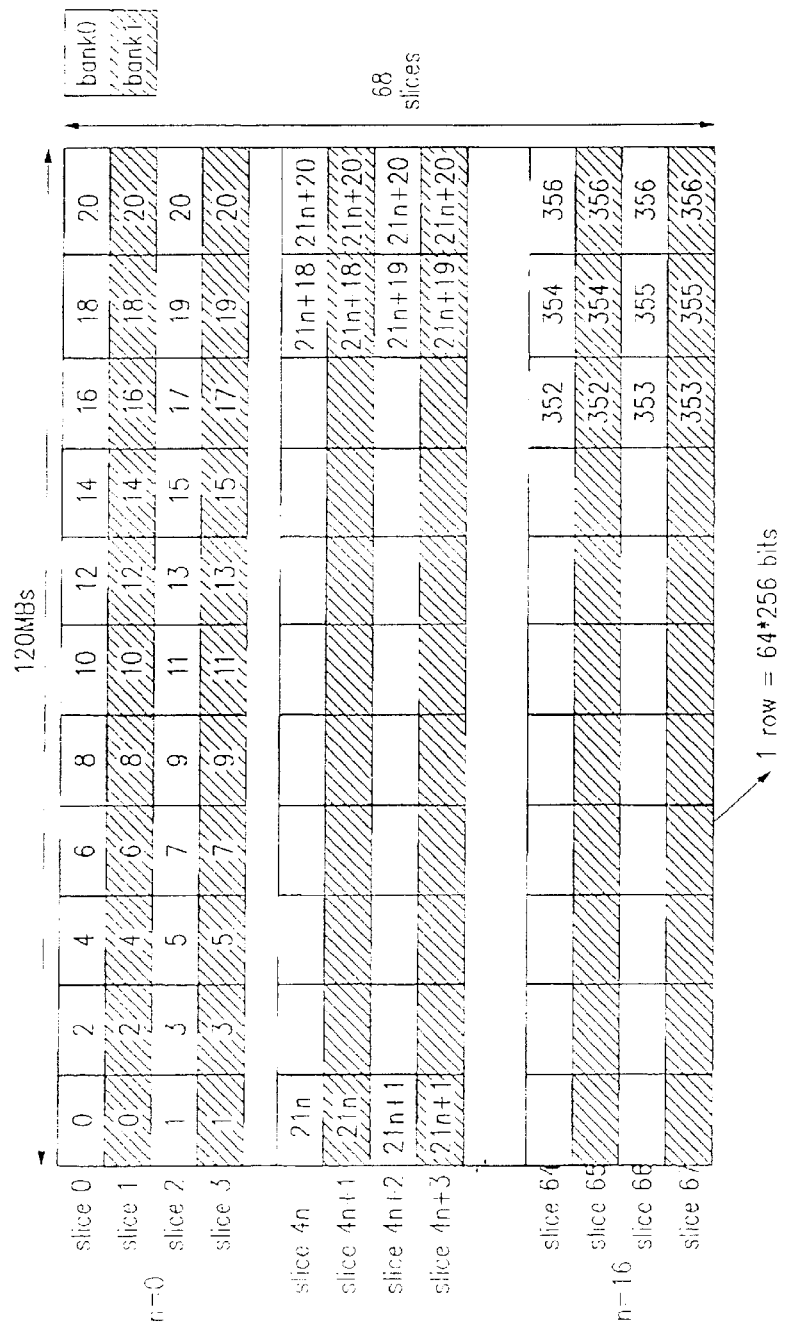
FIG. 9 shows an external memory map of a luminance frame compressed according to the present invention.
Figure 10:
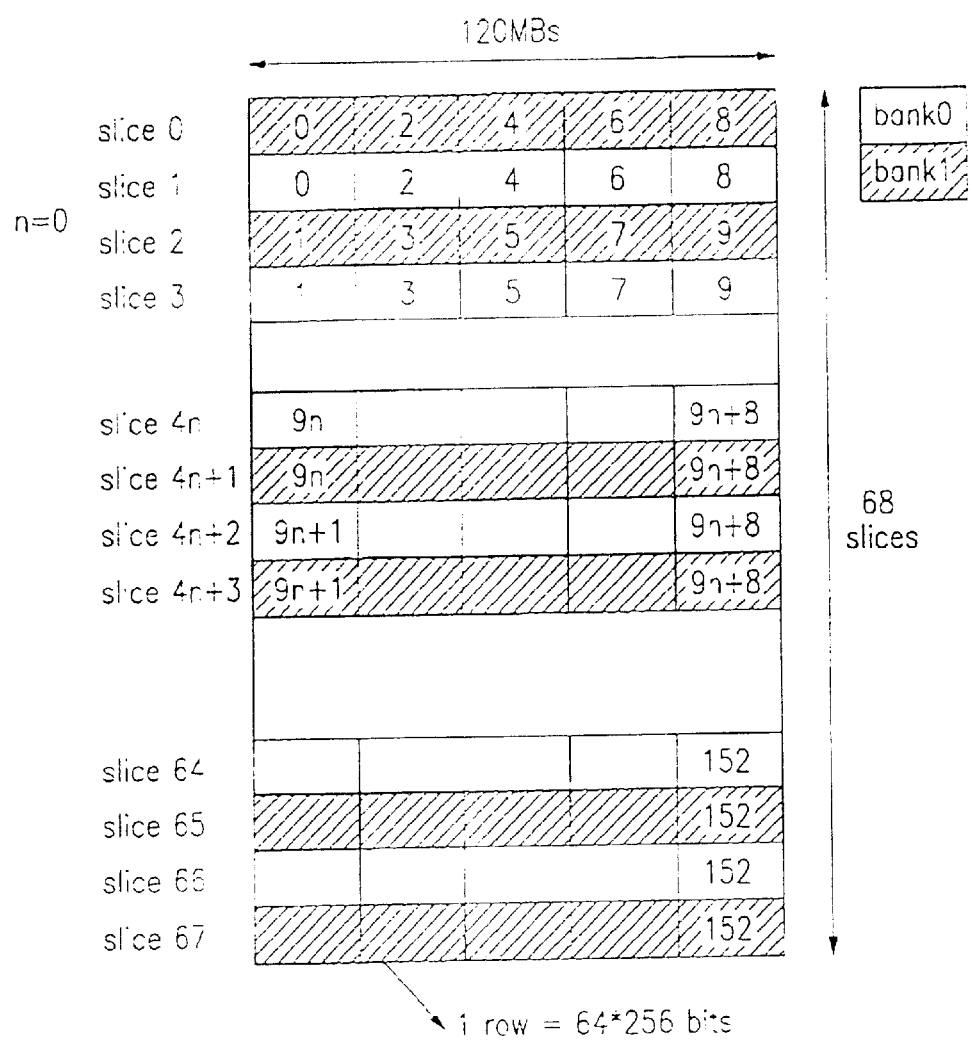
FIG. 10 shows an external memory map of a color frame compressed according to the present invention.

The data remaining alter filling a data width of 32 bits is combined with the bits of the next block, and the data is continuously filled by the barrel shifter in units of 32 bits. The filled-in data are positioned in the external memory 105 as shown in FIGS. 9 and 10. FIG. 9 is a memory map of the compressed luminance signal frame, and FIG. 10 is a memory map of the compressed color signal frame.

The external memory 105 is divided into two banks for an efficient memory access such that the upper and lower slices have different bank addresses. Since the memory block in the last column has half the size of the other blocks, a same address is designated for the last column of the next slice with respect to the remaining memory blocks. Thus, a full-sized data block can be obtained.

There are times when the bit stream compressed by the ADPCM compression unit 204 and stored in the external memory 105 needs to be restored. For instance, the bit stream stored in the external memory 105 after undergoing the ADPCM may be read and restored for motion compensation by the video decoder 105 and for image display by the VDP 103.

Figure 11A:
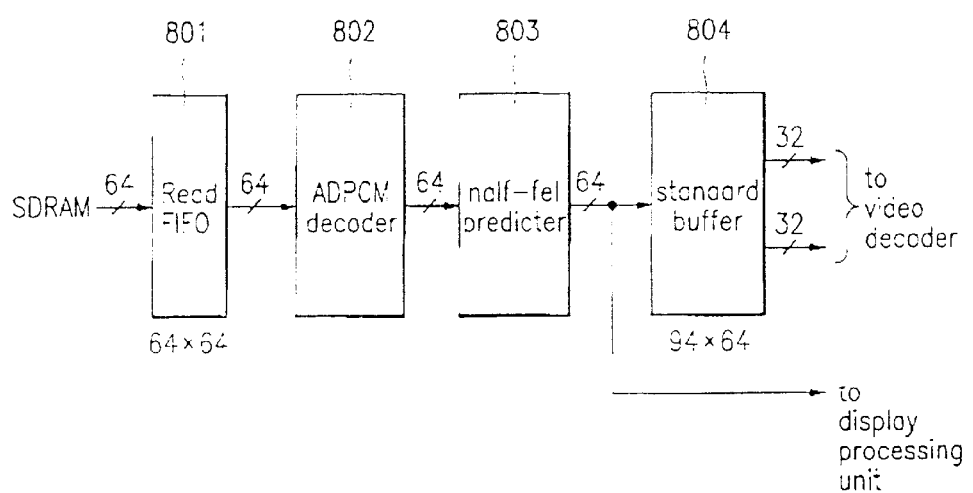
FIG. 11a is a block diagram of a decompression unit of the ADPCM in FIG. 3.
Figure 11B:
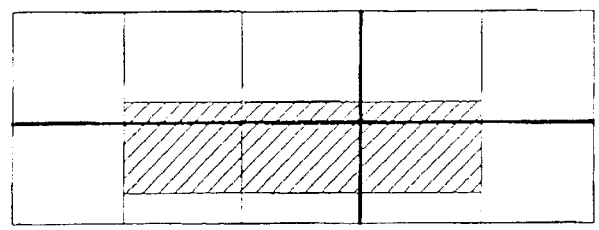

An ADPCM decompression unit is implemented in the memory reduction unit 200. An example of the ADPCM decompression unit is illustrated in FIG. 11a. An ADPCM decoder 802 reads the code stored in the external memory 105 and the standard deviation signals through a read FIFO 801 to reconstruct a macro-block. If a SDRAM is used for the external memory 105, a data stretched over two slices read by the FIFO 801 from the external memory 105 is read with an interleaving access method of the SDRAM, as shown in FIG. 11b, thereby reducing the memory access time.

Figure 12:
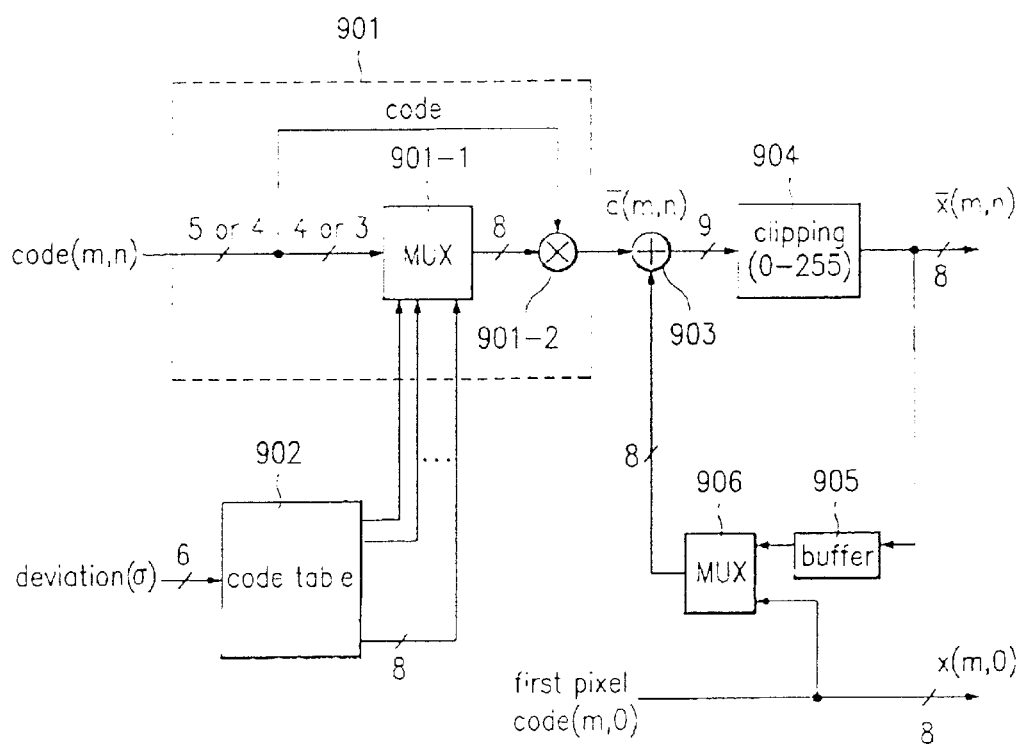

When the video decoder 102 performs a compensation for half-fel motion, the final outcome of the ADPCM decoder 802 is transferred to the video display processing unit 103 through a half-fel predicter 803 in pixel units, and is temporarily stored in a standard buffer 804 to be output to the video decoder 102. FIG. 12 is a block diagram showing the ADPCM decoder 802.

Referring to FIG. 12, pixels code(m,0) in the first row of each sub-block is output to the multiplexer 901-1 as the original pixel value x(m,0). The reconstruction unit 901 receives the next pixel value, i.e. code(m,n), through the read FIFO 801, obtains and outputs a prediction error $\bar{d}(m,n)$ to an adder 903. The adder 903 adds the output from a multiplexer 906 with the prediction error $\bar{d}(m,n)$ to restore a macro-block.

The pixels code(m,n) input to the reconstruction unit 901 is 5 bits for a luminance signal and 4 bits for a color signal. The most significant bit is a sign bit, and the remaining bits represent the bit size (e.g. 4 in case of a luminance signal, and 3 in case of a color signal). This is because the ADPCM encoder 204 performs a coding using sixteen quantization levels for a luminance signal, and eight quantization levels for a color signal.

Accordingly, the sign bit is output to the multiplier 901-2 while the remaining data other than the sign bit are output to the multiplexer 901-1 as a selection signal. The multiplexer 901-1 outputs one of the reconstruction levels of a code table unit 902 to the multiplier 901-2 in accordance with the quantization code value. The multiplier 901-2 multiplies the reconstruction level selected and output through the multiplexer 901-1 by the code bit, and outputs the resultant value to the adder 903. The output of the multiplier 901-2 is the prediction error $\overline{d}(m,n)$. Therefore, the prediction error $\overline{d}(m,n)$ has a data format representing the most significant bit and the remaining bits have a format representing the respective sizes. The code table unit 902 is identical to the code table unit 407 described with reference to FIG. 5.

Meanwhile, the output of the adder 903 is input to a clipping unit 904, and is limited not to exceed 8 bits. The output of the clipping unit 904 is simultaneously output to the half-fel predicter 803 and to the multiplexer 906 through a buffer 905.

The ADPCM decoder 802 has a very simple hardware structure in comparison with the ADPCM compression unit 204.

The following shows the effects of compression of the external memory 105 when the method suggested in the present invention is applied.

M×N: a size of a macro-block n1: quantization bits with respect to Y n2: quantization bits with respect to Cb, Cr v1: standard deviation bits with respect to Y vs: standard deviation bits with respect to Cb, Cr For a luminance signal, the total number of bits used for compressing the corresponding macro-block (Y) is as follows.

Bit_Y=(M×8+M×(N−1)×n1−v1)×256/(M×N)

Here, M×8 represents the number of pixels in the first row; M×(N−1)×n1 represents the total quantization coefficient, and 256/(M×N) represents the number of sub-blocks within the macro-block.

The total number of bits used for compressing the corresponding macro-block (Cb, Cr) is as follows.

Bit_C=(M×8−M×(N−1)×n2−v2)×128/(M×N)

Here, M×8 represents the number of pixels in the first row; M×(N−1)×n2 represents the total quantization coefficient and 128/(M×N) represents the number of sub-blocks within the macro-block.

For example, if M=4, N=8, n1=5 bits, n2=4 bits; v1=v2=6 when compressing the signals of 1920×1088, the total number of macro-blocks is 8160.

Total bits=(BY+BC)×8160=16515840 bits

Therefore, the compressibility can be expressed by the following Equation 5.

$$\text{Compressibility} = \frac{\text{total bits}}{1920 \times 1088 \times 1.5} = 5.27 b/p, \quad [5]$$

As described above, the apparatus for receiving motion pictures to reduce an external memory of the MPEG-2 video decoding according to the present invention has the following advantages. The motion pictures are adaptively compressed with an ADPCM method in accordance with their characteristics, thereby improving an objective peak-to-peak signal noise ratio (PSNR) as well as a visual effect of the restored image. Also, the hardware can be simplified.

In particular, diverse services such as OSD or multi-decoding can be provided while maintaining a highly-defined motion picture of MPEG-2 MP@HL in fields such as digital TV and visual conference. Furthermore, the cost competitiveness can be achieved due to the reduction of width and capacity of memory. Finally, the improved performance of video decoding chip allows a technical competitiveness of digital TVs.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for receiving motion pictures having an external memory and a video decoder for restoring original pixel values after a variable length decoding process, an inverse quantization, an IDCT process, and a motion compensation process of video bit stream in a macro-block units, comprising:

a compression unit which divides a decoded macro-block into a plurality of sub-blocks, and compresses decoded pixel values in each sub-block to store in said external memory;

a decompression unit which reads the compressed pixel value from said external memory and restores the compressed pixel values to an original pixel value in a macro-block units; and a memory control unit which controls compression and reconstruction of pixel values, and controls storage of said pixel values in said external memory, wherein said compression unit comprises:

a deviation calculation unit which calculates a standard deviation of the decoded pixel values for each sub-block;

a buffer which temporarily stores the decoded pixel values in a macro-block unit and outputs the decoded pixels in sub-block units;

an ADPCM compression unit which outputs first rows of each sub-block output from said buffer as original pixel values without compression, codes a difference between a prediction value and a current pixel value with respect to each remaining rows of each sub-block, and adjusts a quantization interval using the standard deviation when performing the coding; and a write FIFO which temporarily stores an output of said ADPCM compression unit, and conforms the video decoder to a data rate of said external memory.

2. An apparatus of claim 1, wherein an order of scanning in said ADPCM compression unit uses previous value of pixels in a horizontal direction of each row of a sub-block as the prediction value.

3. An apparatus of claim 1, wherein said ADPCM compression unit comprises:
   a prediction error output unit which obtains a difference between data output from said buffer and a prediction data;
   an adaptive quantization unit which performs a quantization of a prediction error from said prediction error output unit, and adjusts quantization intervals in each sub-block using the standard deviation;
   an adaptive inverse quantization unit which inverse quantizes the quantized data using the standard deviation; and
   a prediction unit which obtains the prediction data based on the inverse quantized data, and feeds back the prediction data to said prediction error output unit.

4. An apparatus of claim 3, wherein said adaptive quantization unit sets different quantization levels for a luminance signal and a color signal.

5. An apparatus of claim 3, wherein said adaptive quantization unit adjusts intervals between quantization levels by multiplying a normalized quantization value with the standard deviation, wherein said normalized quantization value is output from a code table which stores normalized quantization level values.

6. An apparatus of claim 3, wherein said write FIFO comprises:
   a code FIFO which stores a code value quantized by said adaptive quantization unit;
   a deviation FIFO which stores said standard deviation; and
   a barrel shifter which bit-sorts the standard deviation and quantization code in said external memory when writing/reading.

7. An apparatus of claim 6, wherein said write FIFO continuously fills data remaining after filling a data width of 32 bits in combination with the bits of the next block, and data is continuously filled by said the barrel shifter in units of 32 bits for storage in said external memory.

8. An apparatus of claim 6, wherein said external memory allocates a synchronous DRAM to have bank addresses of different upper and lower slices.

9. An apparatus of claim 1, wherein said deviation calculation unit includes a device for adjusting an interlaced scanning and a progressive scanning standard deviation to conform with a DCT type of a macro-block.

10. An apparatus of claim 1, wherein said deviation calculation unit comprises:
    a variance computing unit which obtains a variance in a sub-block unit after receiving a plurality of pixels in parallel in one clock;
    a deviation computing unit which obtains the standard deviation by taking a square root of the output from said variance computing unit;
    a deviation control unit which zeros and outputs a least significant bit of the standard deviation, if the standard deviation from said deviation computing unit is a standard deviation of a luminance signal, and outputs the standard deviation as is, if the standard deviation output from said deviation computing unit is a standard deviation of a color signal;
    a deviation adjustment unit which limits a range of the standard deviation of a luminance signal and a color signal output from said deviation control unit;
    a comparator which obtains a maximum value of prediction error from each difference signal of a plurality of pixels parallely input in one clock to be compared with a pre-set threshold value; and
    a final deviation output unit which outputs a final standard deviation by adding a luminance signal offset or a color signal offset to the standard deviation from said deviation adjustment unit, if said comparator determines the maximum value of the prediction error to be greater than the pre-set threshold value, and outputs a final standard deviation as is from said deviation adjustment unit if said comparator determines the maximum value of the prediction error to be not greater than the pre-set threshold value.

11. An apparatus of claim 1, wherein said memory control unit generates a signal such that said decompression unit reads the data stretched over two slices with an interleaving access method.

12. An apparatus for receiving motion pictures comprising:
    a transport decoder which selects a program signal from a plurality of programs included in a channel, and separates the selected program signal into audio bit stream and video bit stream;
    a video decoder which receives the video bit stream through a data bus and eliminates overheads from the video stream, said video decoder also variable length decoding, inverse quantizing, IDCT, and motion compensating the video bit steam to restore pixel values of the an original image;
    a video display processor which either re-sorts or outputs data of the restored pixel values in accordance with a picture type;
    an external memory which temporarily stores a bit stream for decoding, for motion compensation, and for displaying decoded data; and
    a memory reduction unit which calculates a standard deviation for each macro-block of a restored image, compresses and stores each macro-block in a buffer using the standard deviation $\sigma$, and when said buffer is filled, stores the compressed data in the external memory,
    wherein the memory reduction unit comprises:
       an adder which receives and adds IDCT data with motion compensated data from the video decoder;
       a deviation computing unit which computes a standard deviation from the output of the adder;
       a STR buffer which stores the output of the adder in macro-block units;
       an ADPCM encoder which compresses data within each macro-block stored in the STR buffer by ADPCM method based upon the standard deviation;
       a PCM buffer which stores the data compressed by the ADPCM encoder; and
       a write FIFO which reads and stores in the external memory the data compressed and stored in the PCM buffer, when the PCM buffer is filled.

13. A memory reduction unit for an apparatus which receives motion pictures comprising:
    an adder which receives and adds IDCT data with motion compensated data from a video decoder;
    a deviation computing unit which computes a standard deviation from the output of the adder;
    a STR buffer which stores the output of the adder in macro-block units;

an ADPCM encoder which compresses data within sub-blocks of each macro-block stored in the STR buffer by ADPCM method based upon the standard deviation;

a PCM buffer which stores the data compressed by the ADPCM encoder; and a write FIFO which reads and stores in an external memory the data compressed and stored in the PCM buffer, when the PCM buffer is filled.

14. An apparatus of claim 13, wherein ADPCM encoder comprises:

a prediction error output unit which obtains a difference between a current input data and a prediction data;

an adaptive quantization unit which performs a quantization of a prediction error from said prediction error output unit, and adjusts quantization intervals in each sub-block using the standard deviation;

an adaptive inverse quantization unit which inverse quantizes the quantized data using the standard deviation; and a prediction unit which obtains the prediction data based on the inverse quantized data, and feeds back the prediction data to said prediction error output unit.

15. An apparatus of claim 14, wherein said adaptive quantization unit sets different quantization levels for a luminance signal and a color signal.

16. An apparatus of claim 14, wherein said adaptive quantization unit adjusts intervals between quantization levels by multiplying a normalized quantization value with the normalized deviation, wherein said normalized quantization value is output from a code table which stores normalized quantization level values.

17. An apparatus of claim 14, the write FIFO comprises:

a code FIFO which stores a code value quantized by said adaptive quantization unit;

a deviation FIFO which stores said standard deviation; and a barrel shifter which bit-sorts the standard deviation and quantization code in said external memory when writing/reading.

18. An apparatus of claim 13, wherein the deviation computing unit includes a device for adjusting an interlaced scanning and a progressive scanning standard deviation to conform with a DCT type of a macro-block.

* * * * *